(12) United States Patent
Agrawal et al.

(10) Patent No.: US 6,795,709 B2
(45) Date of Patent: Sep. 21, 2004

(54) METHOD AND APPARATUS FOR DYNAMIC IP ADDRESS ALLOCATION FOR WIRELESS CELLS

(75) Inventors: Prathima Agrawal, New Providence, NJ (US); David Famolari, Monclair, NJ (US); Tao Zhang, Fort Lee, NJ (US)

(73) Assignee: Telcordia Technologies, Inc., Piscataway, NJ (US)

(*) Notice: Subject to any disclaimer, the term of this patent is extended or adjusted under 35 U.S.C. 154(b) by 633 days.

(21) Appl. No.: 09/840,254

(22) Filed: Apr. 23, 2001

(65) Prior Publication Data

US 2002/0155827 A1 Oct. 24, 2002

(51) Int. Cl.[7] .................................................. H04Q 7/20
(52) U.S. Cl. .................... 455/452.1; 455/450; 455/464; 709/226; 370/331
(58) Field of Search .............................. 455/450, 452.1, 455/452.2, 464, 436; 709/226, 229; 370/329, 331

(56) References Cited

U.S. PATENT DOCUMENTS

| | | | | |
|---|---|---|---|---|
| 5,809,423 A | * | 9/1998 | Benveniste | 455/452.2 |
| 6,147,986 A | * | 11/2000 | Orsic | 370/349 |
| 6,427,170 B1 | * | 7/2002 | Sitaraman et al. | 709/226 |
| 6,510,153 B1 | * | 1/2003 | Inoue et al. | 370/354 |
| 2001/0044305 A1 | * | 11/2001 | Reddy et al. | 455/436 |
| 2001/0046215 A1 | * | 11/2001 | Kim | 370/329 |
| 2002/0012339 A1 | * | 1/2002 | Wenzel et al. | 370/352 |
| 2002/0021681 A1 | * | 2/2002 | Madour | 370/331 |
| 2002/0068570 A1 | * | 6/2002 | Abrol et al. | 455/438 |
| 2002/0114323 A1 | * | 8/2002 | Chowdhury et al. | 370/352 |

* cited by examiner

Primary Examiner—William Trost
Assistant Examiner—James D Ewart
(74) Attorney, Agent, or Firm—Joseph Giordano; James W. Falk (57) ABSTRACT

Method and apparatus for dynamically allocating IP addresses in a wireless IP network. IP address servers determine the requisite IP address pools and guard bands for individual network cells to guarantee fair access to the network and facilitate handoff host handoff from a prior cell to a new cell. IP address servers also prioritize handoff and resident hosts that request an IP address from the IP address server. In particular, IP address servers assign a higher priority to handoff hosts over resident hosts that request an IP address from an IP address server in order to maintain a preestablished handoff host network connection instead of dropping a handoff host connection in favor of a new resident host network connection. Finally, each cell is allocated a minimum number of IP addresses to ensure a certain level of fair access to the network regardless of the cell wherein a handoff or resident host resides.

11 Claims, 8 Drawing Sheets

METHOD AND APPARATUS FOR DYNAMIC IP ADDRESS ALLOCATION FOR WIRELESS CELLS

FIELD OF THE INVENTION

The present invention generally relates to wireless Internet Protocol (IP) networks. More specifically, this invention relates to dynamic allocation of IP addresses for wireless IP network cells.

BACKGROUND OF THE INVENTION

The advent of wireless IP networks has presented challenging problems in the area of dynamic IP address allocation. Wireless IP networks comprise a plurality of network cells wherein a plurality of handoff and resident hosts communicate with the wireless IP network. Handoff hosts are network hosts whose initial network connection was established in another cell and that subsequently migrate to a new network cell. In contrast, resident hosts are hosts whose initial network connection was established in the present cell and that have not migrated to another network cell. Each network cell further includes a base station that maintains handoff and resident host network connections within the network cell, and facilitates dynamic handoff of handoff hosts within its cell.

The base station within each cell facilitates a network connection with its handoff and resident users through IP addresses assigned to the network hosts within the cell. Thus, an IP address must be allocated to the handoff and resident hosts within a cell to establish and maintain a network connection. The IP addresses dedicated to the handoff and resident hosts can be allocated by methods including an IP address server system(s) that assigns IP addresses for new hosts, and base stations themselves that may determine their own necessary IP address allocation. IP address servers that allocate IP addresses can include servers that are part of a base station itself, or can include IP address servers that are attached to the network and send IP addresses allocations to the base station within a cell. These IP address allocation methods and apparatuses confront a number of problems when allocating IP addresses to handoff and resident hosts within their cells.

First, whenever a host initially establishes a network connection within a cell, the host is considered a resident host, because it establishes its initial network connection within the cell. In order for the resident host to establish its network connection, a base station within the cell must allocate an IP address from the cell's IP address pool to the resident host. In contrast, whenever a resident host migrates to a new cell after already having its network connection in a prior cell, the host becomes a handoff host, and the new cell must maintain the preexisting network connection of the handoff host. If the new cell has a different IP subnet address relative to the prior cell, the new cell must allocate a new IP address to the handoff host in order to maintain the handoff host's network connection from the prior cell.

Current dynamic IP address allocation protocols such as Dynamic Host Configuration Protocol (DHCP) treat resident and handoff hosts as equivalent and without preference when allocating IP addresses to these hosts. Thus, a base station may allocate an IP address to a resident host instead of a handoff host, thereby permitting a new resident network connection in place of the prior network connection of a handoff host network, which must be dropped. This equal treatment is obviously undesirable, because denying a resident host an IP address will merely prevent a new network connection, whereas denying a handoff host an IP address causes its preexisting network connection to be terminated. Thus, IP address allocations to handoff hosts should be preferred to IP address allocation of resident hosts in order to facilitate the handoff of preexisting handoff host network connections.

Second, the problem of handoff and resident host network access is further aggravated due to the fact that there is no minimum number of IP addresses that are reserved by individual cells to ensure a certain level of host access. The minimum number of IP addresses available will vary from cell to cell, and thus handoff and resident hosts will have differing degrees of access to the IP network based on the particular cell wherein the host is communicating with the network. As a result, fair access to the wireless IP network for handoff and resident hosts differs from cell to cell, because one cell may have significantly fewer IP addresses to allocate relative to another cell. This is another limitation of present IP address allocation protocols, because it is desirable to ensure fair access of handoff and resident hosts to the network regardless of the particular cell wherein these hosts reside.

In sum, present dynamic IP address allocation protocols for wireless IP network systems suffer from two significant problems. First, these protocols treat resident and handoff hosts equally when allocating IP addresses, thereby causing preexisting handoff host network connections to be dropped in favor of new resident host network connections, when it is preferable to preserve a preexisting handoff host network connection by denying a new resident host network connection. Second, there is no minimum number of IP addresses allocated to individual cells, thereby causing fair access problems when different cells provide different numbers of IP addresses for handoff and resident hosts, thereby making network access arbitrarily dependent on the cell in which the handoff and network host reside.

SUMMARY OF THE INVENTION

These and other deficiencies in wireless network dynamic IP address allocation protocols are addressed by the present invention, which is a method and apparatus for dynamic IP address allocation for wireless base stations based on priorities and guard bands.

The method of the system described herein includes several features. First, the total IP address pool of IP addresses for each cell is dynamically determined based on factors including base station demand, thereby ensuring adequate network access from cell to cell. Second, each cell is guaranteed a minimum number of IP addresses for its IP address pool, thereby ensuring a certain level of fair access to the network regardless of the cell wherein a host resides. Third, every cell includes a dynamic guard band of IP addresses reserved exclusively for handoff hosts, thereby mitigating handoff host network connection drops from cell to cell. Fourth, the allocation procedure for IP addresses prioritizes hosts that request IP addresses by favoring handoff hosts over resident hosts when allocating IP addresses, thereby maintaining preexisting network connections of handoff hosts instead of establishing new network connections of resident hosts.

The method herein described is predictive, wherein the size of the IP address pool and guard band for each cell is determined by anticipating handoff and resident host demand on the cell before these hosts actually arrive. Demand predictions for these hosts are based on a number of factors including statistical assessment of IP address demand over time, such as prior days, weeks, and months, as well as real-time factors such as handoff and resident host data traffic levels and demand, and the numbers of handoff and resident hosts.

The prioritization method herein described assigns different priorities to hosts that request an IP address from the present cell and then allocates an IP address to those hosts with a higher priority before those hosts with a lower priority. Thus, in order to prefer handoff hosts over resident hosts, handoff hosts are assigned a higher priority level over resident hosts and are allocated an IP address before resident hosts. In addition, handoff hosts are also inherently preferred over resident hosts due to the fact that a guard band of IP addresses is reserved exclusively for handoff host network connection handoffs within each cell.

The apparatus used to implement this system is an IP address server system that predicts the IP address pool and guard band for each cell base station, establishes an IP address pool based on the anticipated demand, prioritizes host requests for IP addresses, and allocates IP addresses to hosts based on factors including their priority and whether they are a handoff or resident host. Implementation details for the IP address server system vary according to whether the system includes shared and/or dedicated IP address servers. Shared IP address servers predict and allocate IP addresses for multiple base stations within cells, whereas dedicated IP address servers predict and allocate IP addresses for their individual base station.

In a shared IP address server system, a plurality of base stations share a pool of IP addresses with the same subnet address. The shared IP address server predicts the IP address pools and guard bands for each base station, and allocates the IP addresses for each base station accordingly. Thus, the shared IP address server centrally coordinates and allocates IP addresses for the plurality of base stations that it serves.

In the alternative, each base station can perform its own IP address pool and guard band prediction and report the results to the shared IP address server, which makes a final decision on each base station's IP address pool and guard band size based on the aggregate predictions from the base stations. Thus, some of the processing demands to predict IP address pool and guard band size are offloaded from the shared IP address server to individual base stations, but the shared IP address server still makes the final determination of the IP address pool and guard band size for each base station from an overall system perspective.

In a dedicated IP address server system, each base station includes its own dedicated server that independently predicts and determines its own IP address pool and guard band size subject to the limitations of overall system IP address availability. Such limitations guarantee fairness through mechanisms including a maximum limit on the number of IP addresses each cell can use. In order to dynamically adjust IP address pool and guard band size, each dedicated IP address server/base station can communicate with other dedicated IP address servers and base stations to communicate their IP address needs. Such communications allow individual base stations and dedicated IP address servers to respond to dynamic conditions, such as high IP address demand, by borrowing IP addresses from other dedicated IP address servers and base stations when necessary.

Both shared and dedicated IP address server systems prioritize hosts that request IP addresses from the base station/IP address server, and then serve those hosts with a higher priority first. Thus, by assigning handoff hosts a higher priority relative to resident hosts, the IP address server allocates IP addresses to handoff hosts prior to resident hosts, thereby preventing dropped handoff host network connections at the expense of new resident host network connections.

BRIEF DESCRIPTION OF THE DRAWINGS

The foregoing and other features of the present invention will be more readily apparent from the following detailed description and drawings of illustrative embodiments of the invention in which.

DETAILED DESCRIPTION

Figure 1:
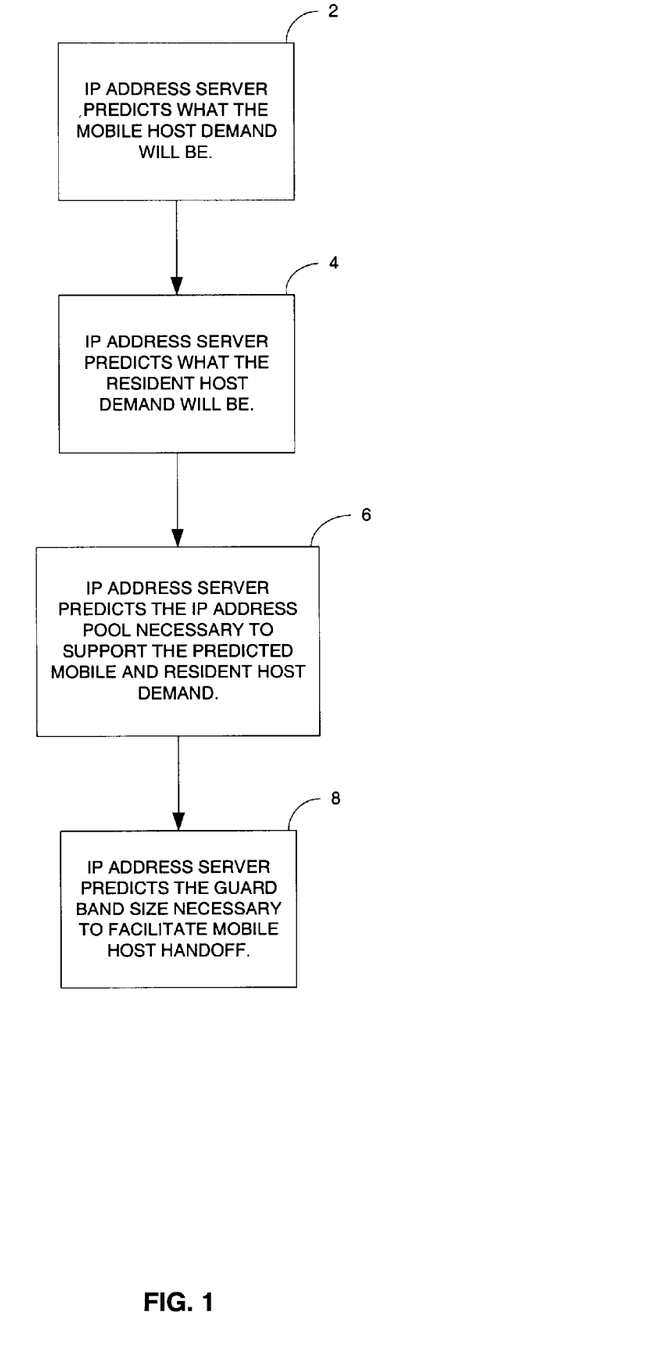
FIG. 1 is a flow chart of the general IP address predictive process of our invention.

Referring now to FIG. 1, therein is shown our general IP address prediction process, wherein an IP address server system predicts the IP address pool and guard band size for individual base stations. By predicting the anticipated IP address pool and guard band size, the IP address server system can facilitate fair access to the wireless IP network regardless of the individual cell wherein a handoff or resident host resides.

Our general IP address prediction process begins when the IP address server predicts the anticipated handoff host demand for IP addresses for base station(s) (step 2). The IP address server then predicts the anticipated resident network host demand for IP addresses for base station(s) (step 4). When performing both of these predictions, the IP address server may use any one of a number of standard predictive algorithms that include real-time and non-real time data processing to predict the anticipated handoff and cellular host demand.

After predicting the handoff and resident host demand, the IP address server then predicts the total IP address pool necessary to support the predicted handoff and resident host demand (step 6). The determination of the total IP address pool is advantageously based on one or more of real time data including present network IP address demands associated with the base station, non-real time data including previous IP address demands associated with the base station, call blocking parameters, quality of service and performance parameters, and third party data including third party ISP address allocation specifications, quality of service parameters, or performance parameters. The IP address server further predicts the size of the guard band necessary to support the predicted handoffs from handoff hosts (step 8). Thus, the IP address server determines the requisite IP address pool and guard bands for base station(s) to support the anticipated handoff and resident host demand. Different mechanisms may be used to determine the size of the guard bands. For example, they can be statistically determined by studying the volume of IP address requirements over time. Statistics, such as time of day, mix of traffic, special situations (expected or unexpected) can be used to estimate the size of the guard bands. If needed, the IP address server can borrow additional IP addresses from a different base station.

While in the embodiments of our invention depicted herein the steps of determining a guard band portion and assigning a priority level are advantageously performed in a predictive analysis module or software included within an IP address server or a base station, as described further below, they can also be performed in a separate software processor.

Figure 2:
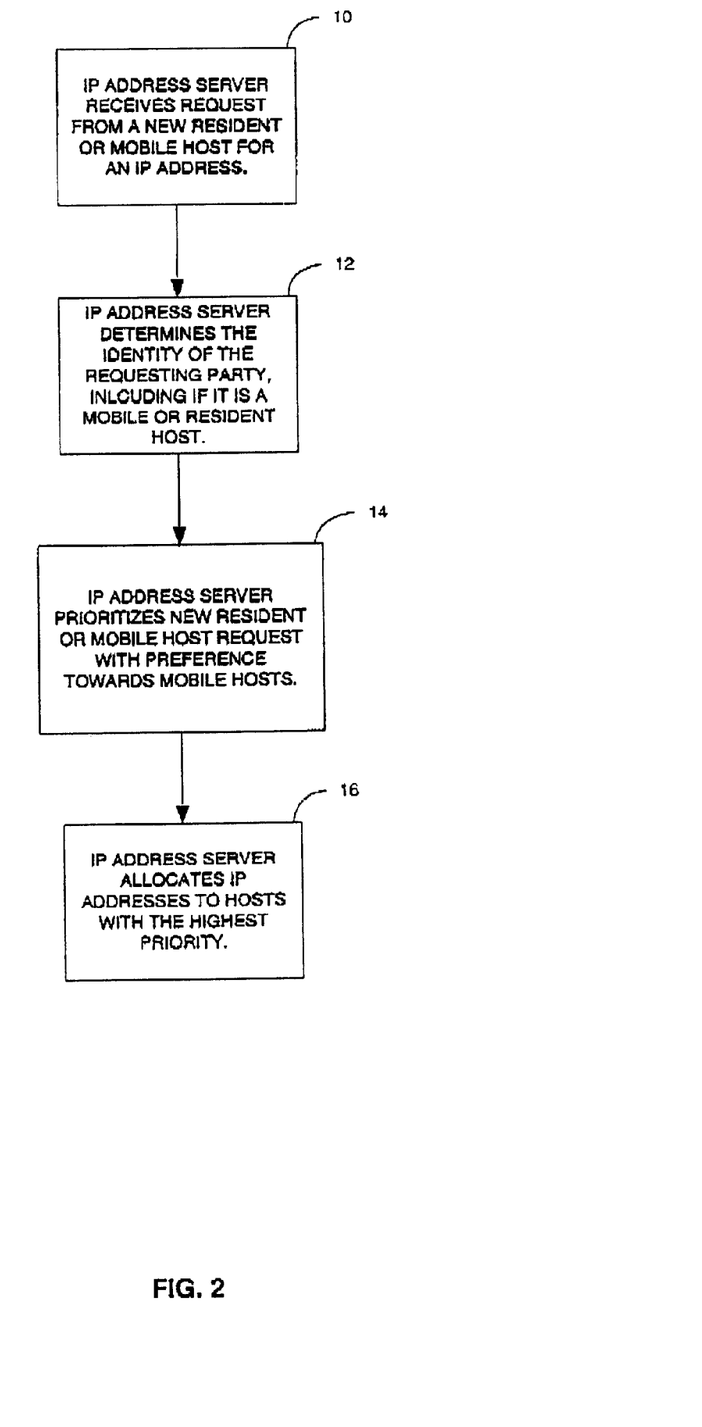
FIG. 2 is a flow chart of the general host prioritization process of our invention.

Referring now to FIG. 2, therein is shown our general host prioritization process, wherein an IP address server prioritizes host requests for IP addresses. By prioritizing handoff hosts over resident hosts, the IP address server establishes a preference for handoff host handoff over new resident host network connections, thereby maintaining preestablished handoff host network connections.

Our general host prioritization process begins when an IP address server receives an IP address request from a new handoff or cellular host (step 10). The IP address server determines the identity of the requesting host, including if it is a handoff or resident host (step 12). The IP address server then prioritizes the IP address request of the requesting host, and does so by designating handoff hosts as having a higher priority than resident hosts (step 14). The IP address server then allocates IP addresses to the requesting hosts in their order of priority whenever an appropriate IP address becomes available (step 16).

Figure 3:
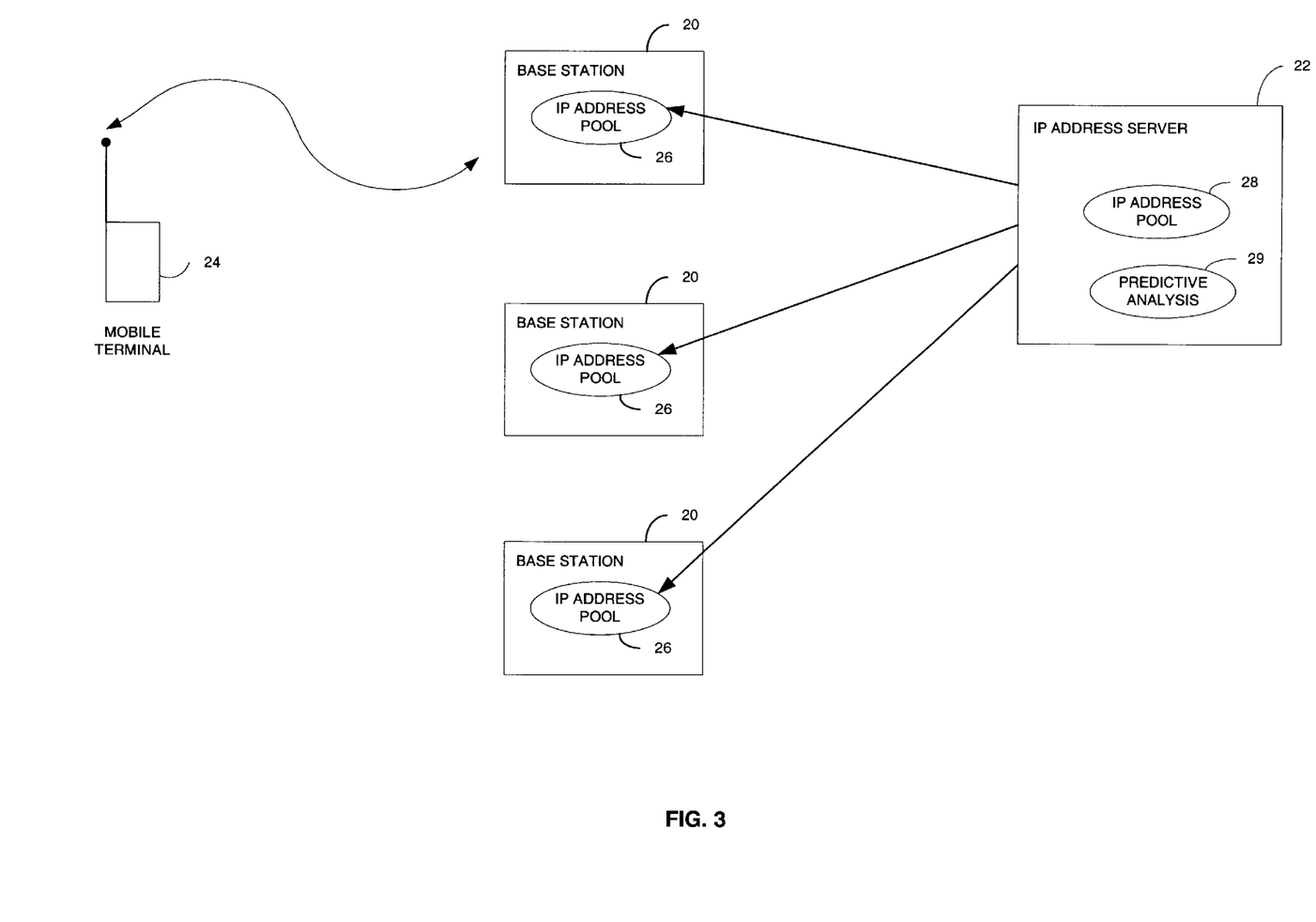
FIG. 3 is a block diagram of the particular apparatus of a wireless IP network illustrative of one specific embodiment of our invention wherein a shared IP address server is utilized with base station requests.

Turning now to FIG. 3, there is depicted a block diagram of one illustrative embodiment of our invention. Each of a plurality of base stations or cells 20 can be accessed by an IP address server 22 for establishing communications between a base station 20 and a mobile terminal 24. Each of the base stations 20 includes an IP address pool 26. The IP address server 22 comprises a processor and memory and includes an IP address pool 28 and a predictive analysis module 29. An address pool simply stores a list of available addresses, while an address server contains information to validate, update, and change address pools. In the network, the IP address server can reside in any one of a number of network elements, such as the Base Station Controller for the mobile network, the Mobile Switching Center, or can be incorporated into a stand alone piece of equipment. The processes described above with reference to FIGS. 1 and 2 are performed by the predictive analysis module or software 24 of the IP address server 22.

Figure 4:
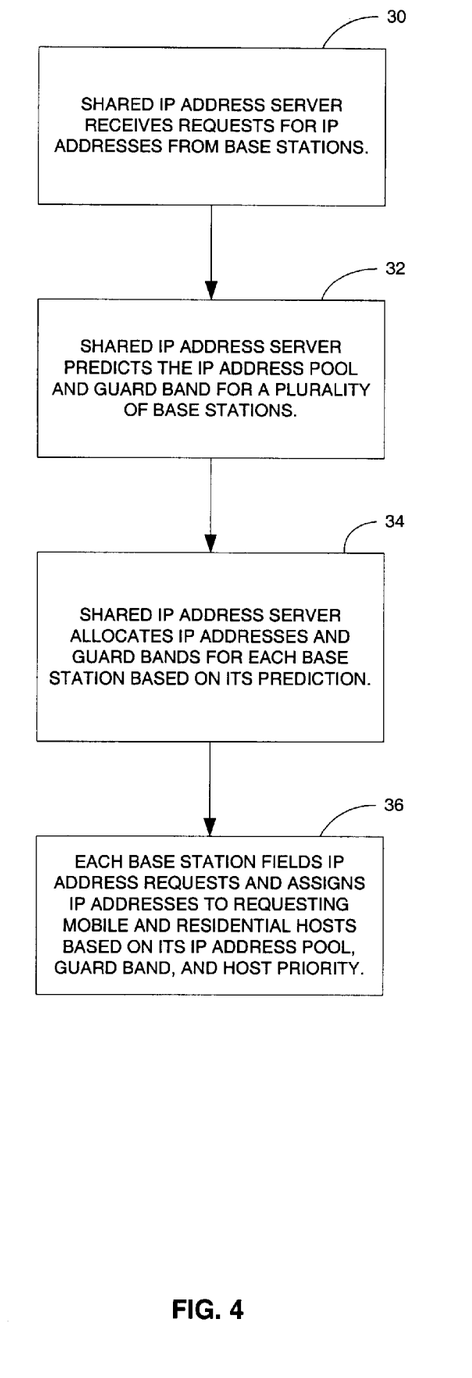
FIG. 4 is a flow chart of the process performed by the embodiment of FIG. 3 in accordance with our invention.

The operation of the embodiment of FIG. 3 can be best understood with reference to FIG. 4. As noted above in this embodiment a single IP address server 22 operates as a shared server between multiple base stations 20, and determines the IP address pools and guard bands for a plurality of base stations 20. By determining the IP address pools and guard bands for a plurality of base stations, our invention is able to allocate a wider pool of IP addresses among a plurality of base stations, but does so at the cost of increased overhead.

The process depicted in FIG. 4 begins when the shared IP address server 22 receives IP address requests from a plurality of base stations 20 (step 30). The shared IP address server 22 uses this information, along with other real-time and non-real-time data, to determine the IP address pools and guard bands for the plurality of base stations 20 for which it is responsible to allocate IP addresses (step 32). The shared IP address server 22 then allocates the appropriate IP addresses and guard bands to the individual base stations 20 based on its determination of the appropriate IP address pools and guard bands for these individual base stations 20 (step 34). The individual IP address servers 26 for the individual base stations 20 then field IP address requests from handoff and resident hosts and allocate IP addresses from their IP address pool 26 and guard band as designated by the shared IP address server (step 36).

Figure 5:
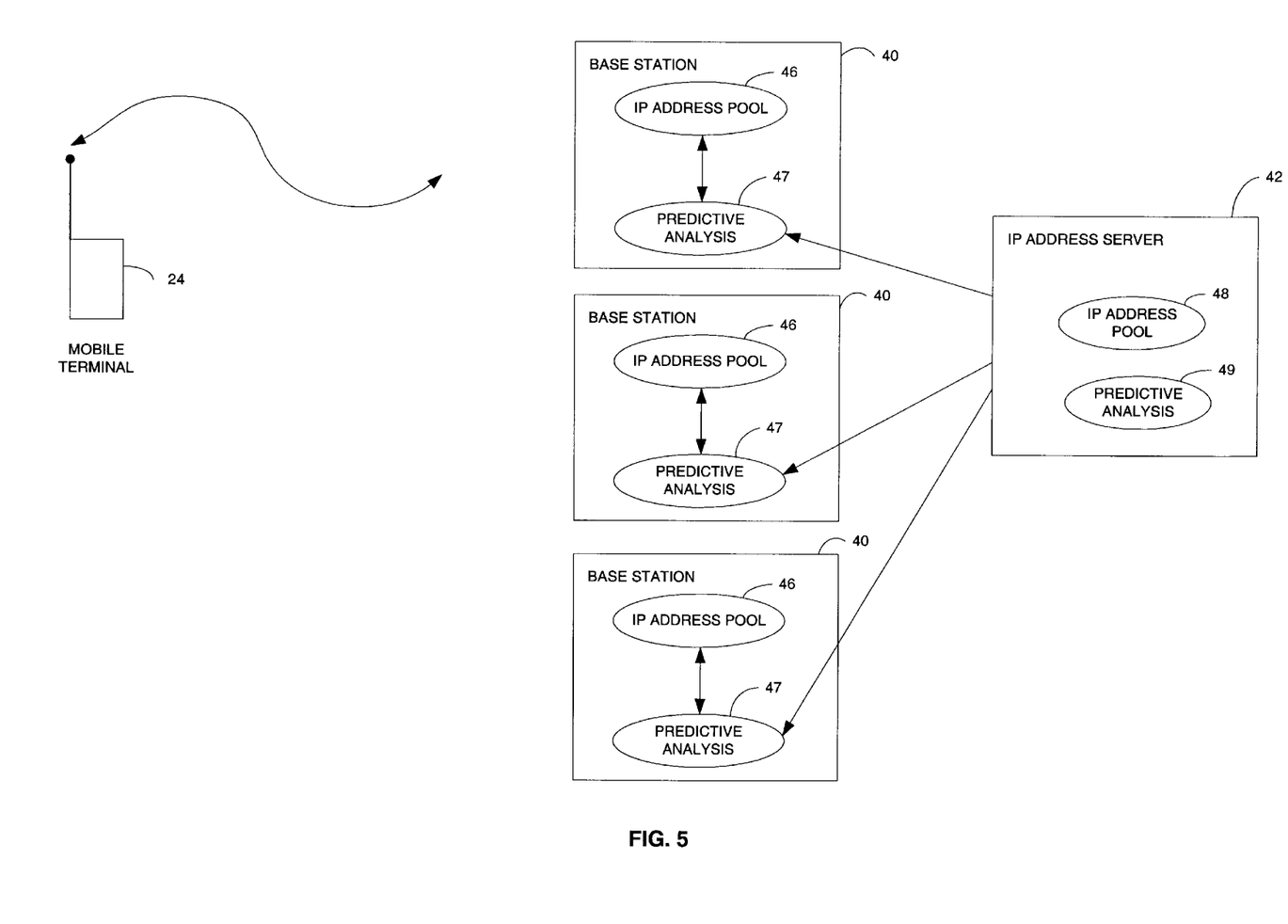
FIG. 5 is a block diagram of the specific apparatus of a wireless IP network illustrative of another specific embodiment of our invention wherein a shared IP address server is utilized without base station requests.

Turning now to FIG. 5, the embodiment of our invention therein depicted performs a hybrid shared IP process. In this embodiment the base stations 40 positioned between the mobile terminals 24 and the IP address server 42 each include an IP address pool 46 and a predictive analysis module or software 47. The IP address server 42 again includes both the IP address pool 48 and the predictive analysis module or software 49. Predictive analysis modules are included in both the base stations 40 and the IP address server 42 because the predictive analysis in the address server 42 will maintain state information and predict aggregate demand levels based upon multiple inputs from the base stations 40. For instance, it can make decisions about future demands across multiple base stations. If one base station provides a predictive analysis that it will need X number of addresses in the next hour and a second base station provides a predictive analysis that it will need Y addresses in the next hour, the predictive analysis at the address server 42 can use historical data and information from the other base stations to determine the right number of addresses to allocate. Also the predictive analysis at the IP address server 42 can aggregate and categorize the data regarding the nature of the requests coming from the base stations, such as how many requests come from mobile hosts and how many come from resident hosts.

In the operation of this embodiment a shared IP address server 42 still determines the IP address pool and guard bands for a plurality of base stations 40, but the IP address server for each base station performs some of the predictive functions for its IP address pool and guard band, and then forwards its prediction to the shared IP address server, which makes the final IP address pool and guard band allocations for each base station based on the aggregate predictions from all the base station IP address servers.

Figure 6:
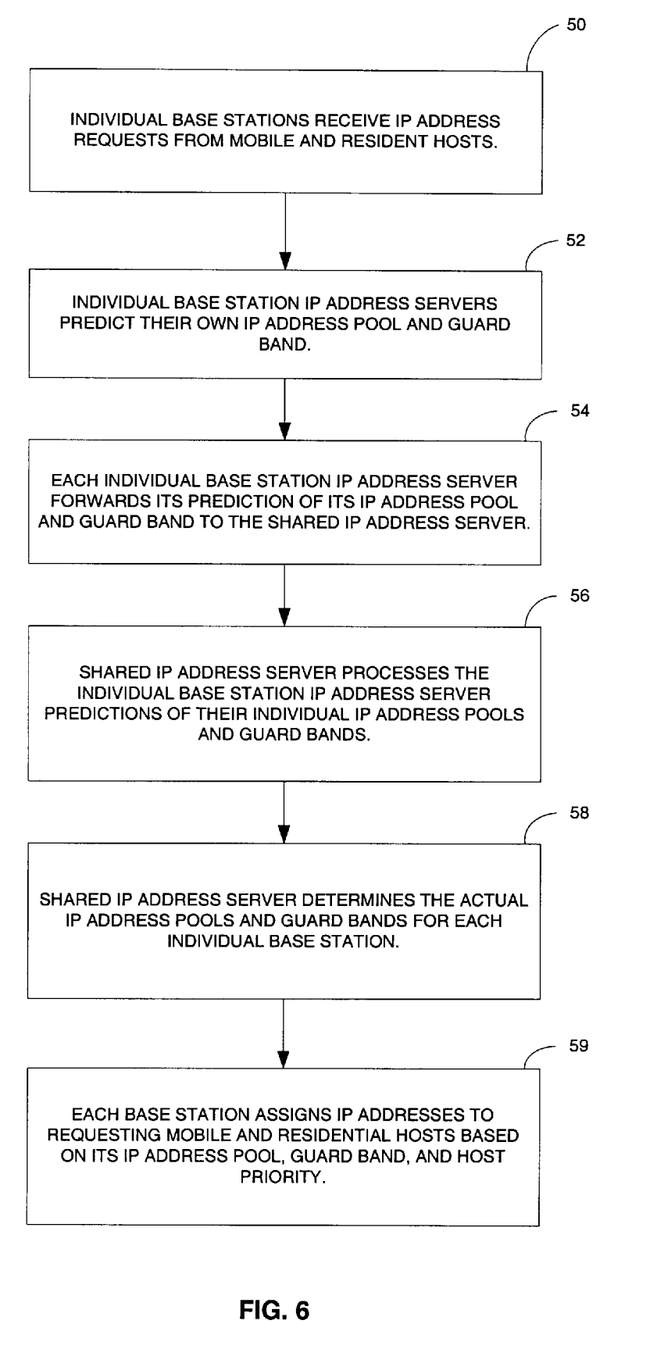
FIG. 6 is a flow chart of the process performed by the embodiment of FIG. 5 in accordance with our invention.

The hybrid shared IP address server system process begins when the individual IP address servers for each base station receive IP address requests from a plurality of handoff and resident hosts (step 50). Each base station's IP address server processes this information, along with other real-time and non-real-time data, to predict the IP address pool and guard band size for the base station (step 52). Each IP address server then forwards its prediction of its IP address pool and guard band size to the shared IP address server responsible for allocating IP address pools and guard bands for the particular base station (step 54).

The shared IP address server processes the individual IP address pool and guard band predictions from the individual base stations (step 56), and then allocates the appropriate IP addresses and guard bands to the individual base stations based on the shared IP address server's determination of the appropriate IP address pools and guard bands for these individual base stations (step 58). Each individual IP address server for an individual base station then fields IP address requests from handoff and resident hosts and allocates IP addresses from its IP address pool and guard band as designated by the shared IP address server (step 59).

Figure 7:
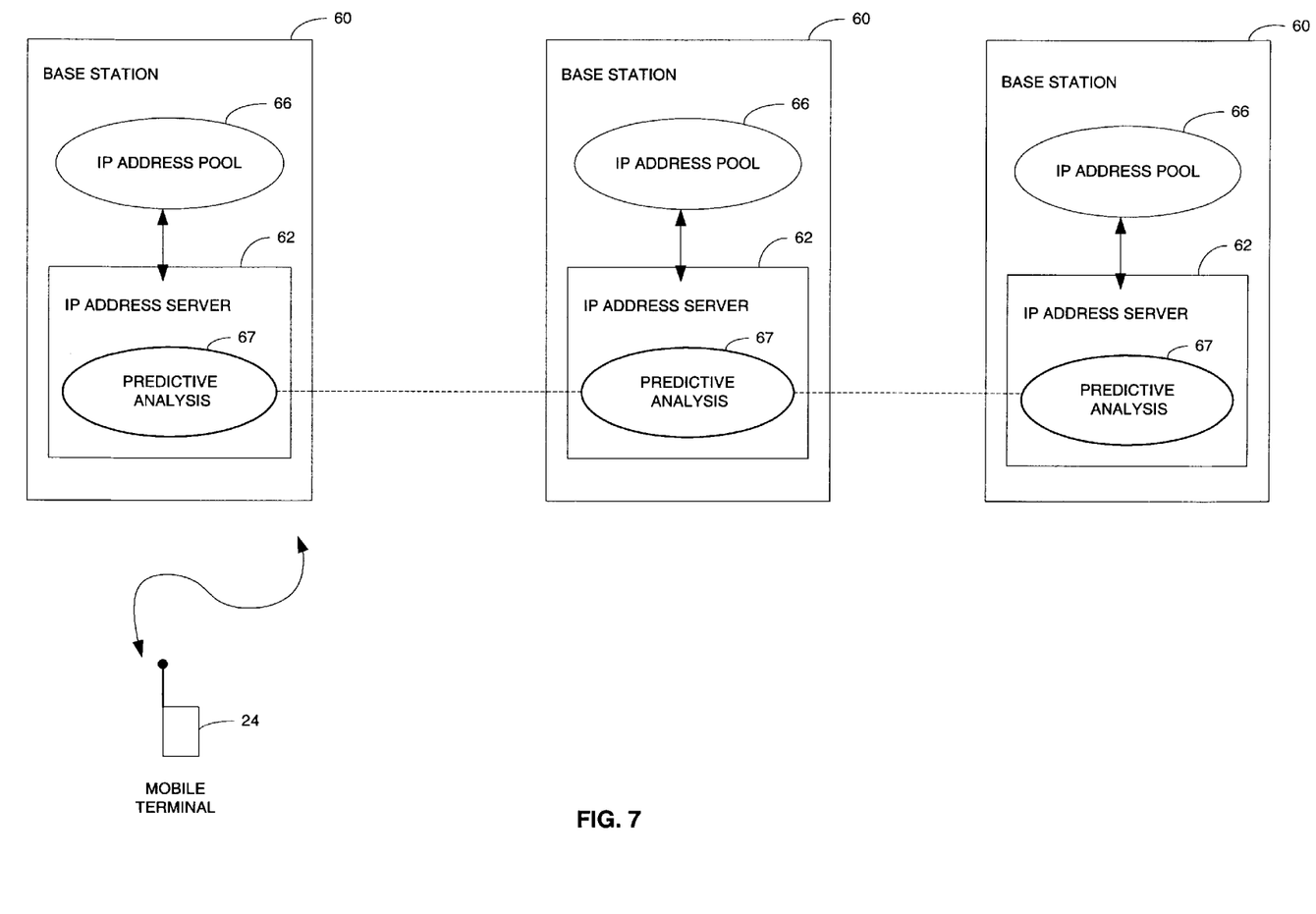
FIG. 7 is a block diagram of another specific illustrative embodiment of our invention wherein each base station has a dedicated IP address server.

Referring now to FIG. 7, there is depicted another illustrative embodiment of our invention wherein each base station 60 has, in addition to its IP address pool 66, its own dedicated IP address server 62 including its predictive analysis software or module 67. Each base station 60 can thus determine its own IP address pool and guard band without the oversight of a shared IP address server. The dedicated IP address servers 62 avoid the overhead associated with communicating with a separate shared server, but are constrained by overall IP address allocation limitations to ensure that an appropriate pool of IP addresses and guard bands is preserved for each individual base station.

Figure 8:
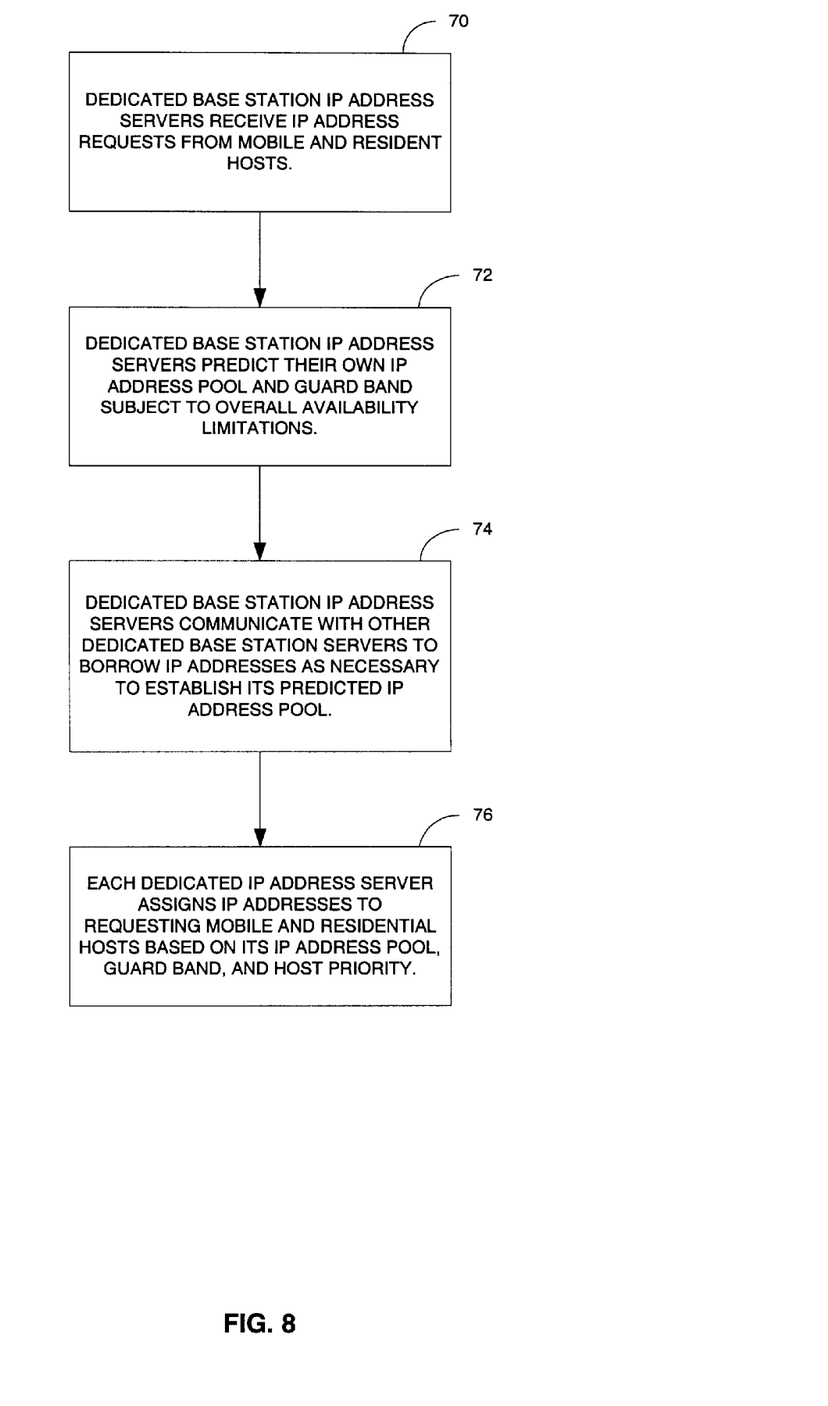
FIG. 8 is a flow chart of the process performed by the embodiment of FIG. 7 in accordance with our invention.

The dedicated IP address server system process of the embodiment of FIG. 7 is depicted in FIG. 8. The process begins when the dedicated IP address server 62 of a base station 60 receives IP address requests from handoff and resident hosts (step 70). The dedicated IP address server 60 processes this information, along with other real-time and non-real-time information and determines its individual IP address pool and guard band requirements (step 72). After determining its IP address pool and guard band requirements, the dedicated IP address server 62 communicates with other dedicated IP address servers 62 for other base stations 60 to borrow IP addresses as necessary to establish its IP address pool and guard band requirements (step 74). The dedicated IP address server 62 then allocates IP addresses from its IP address pool 66 based on its own independent determination of its IP address pool and guard band (step 76).

A number of features of the present invention will be apparent to one skilled in the art. First, third parties such as wireless Internet Service Providers (ISPs) can control allocation of IP addresses to network cells. The present invention enables wireless and wireline ISPs to specify and control how IP addresses should be allocated to network cells in the wireless IP network, thereby allowing the ISP to allocate more IP addresses in specific network cells. For instance, an ISP may allocate more IP addresses to an area where high-paying customers reside so that network performance in that area is enhanced.

When allocating IP addresses to cells, third-party ISPs may directly specify the number of IP addresses to allocate to each cell or geographical area that is covered by multiple network cells in order to support the third-party's services. A third-party may also specify performance objectives that can be achieved by a plurality of IP address allocations to the network cells, and then allow the IP address servers to allocate IP addresses to meet these performance objectives. For instance, a third-party may specify call blocking probabilities and quality of service for a geographical area, and then allow the wireless IP network address servers to determine the actual IP address allocations for cells within the geographical area to meet these performance objectives.

While the invention has been particularly shown and described with reference to preferred embodiments thereof, it will be understood by those skilled in the art that various changes in form and details may be made therein without departing from the spirit and scope of the invention.

We claim:

1. A method of dynamically allocating IP addresses for a plurality of wireless cells, comprising the following steps:

determining a total IP address pool for each of a plurality of wireless cells in an IP address server associated with the plurality of wireless cells;

determining a guard portion of the total IP address pool for each of the plurality of wireless cells, each guard portion being reserved for handoff hosts associated with a particular one of said plurality of wireless cells; and assigning a priority level to a mobile host requesting an IP address associated with each said wireless cell, wherein said priority level is set at a first level in the case of a handoff mobile host and at a second level in the case of a resident mobile host, said first level being greater than said second level.

2. The method of claim 1 wherein each of said cells has an individual IP address server associated therewith.

3. The method of claim 2 wherein each said individual IP address server forwards a prediction of its total IP address pool and guard band to the IP address server associated with the plurality of wireless cells.

4. The method of claim 1 wherein said IP address server is shared by said plurality of cells.

5. A method of dynamically allocating IP addresses to a plurality of wireless cells utilizing a shared IP server, comprising the following steps;

utilizing said shared IP address server to determine a total IP address pool for each of a plurality of wireless cells;

utilizing said shared IP address server to determine a guard band portion of the total IP address pool for each of the plurality of cells, each guard band portion being reserved for handoff hosts associated with a particular one of said plurality of wireless cells, and assigning a priority level to a mobile host requesting an IP address associated with each said wireless cell, wherein said priority level is set at a first level in the case of a handoff mobile host and at a second level in the case of a resident mobile host, said first level being greater than said second level.

6. The method of claim 5 wherein each of said wireless cells includes an IP address pool and predictive analysis module which forwards its predictions to said shared IP address server.

7. A method of dynamically allocating IP addresses for a plurality of wireless cells utilizing an IP address server, comprising the following steps:

at each of said plurality of wireless cells, estimating a total IP address pool for said each wireless cell and providing said estimated total IP address pool to said IP address server;

at each of said plurality of wireless cells, estimating a guard band portion of the total IP address pool for said each wireless cell and providing said estimated guard band portion to said IP address server;

utilizing said IP address server to determine an allowed total IP address pool and allowed guard band portion for each of said plurality of wireless cells, said IP address server utilizing the estimated total IP address pool and estimated guard hand portion from each of said plurality of wireless cells in determining the allowed total IP address pool and allowed guard band portion of each of said plurality of wireless cells;

assigning a priority level to a mobile host requesting an IP address associated with each said wireless cell, wherein said priority level is set at a firs level in the case of a handoff mobile host and at a second level in the case of a resident mobile host, said first level being greater than said second level; and said IP address server in response to said priority levels allocating IP addreses to handoff hosts prior to resident hosts.

8. A system for dynamically allocating IP address for a wireless cell, comprising
- an IP address server remote from said wireless cell and which determines a total IP address pool for said wireless cell and a guard band portion of the total IP address pool, the guard band portion being reserved for handoff hosts; and
- said wireless cell operative to assign a priority level to a mobile host requesting an IP address associated with said wireless cell, wherein said priority level is set at a first level in the case of a handoff mobile host and at a second level in the case of a resident mobile host, said first level being greater than said second level.

9. A system for dynamically allocating IP addresses for a plurality of wireless cells, comprising:
- an IP address server remote from said wireless cells and which determines a total IP address pool for each of said plurality of wireless cells, and a guard band portion of the total IP address pool for each the plurality of cells, each guard band portion being reserved for hand-off hosts associated with a particular one of said plurality of wireless cells; and
- each said wireless cell operative to assign a priority level to a mobile host requesting an IP address associated with each said wireless cell, wherein said priority level is set at a first level in the case of a handoff mobile host and at a second level in the case of a resident mobile host, said first level being greater than said second level.

10. A system for dynamically allocating IP addresses for a plurality of wireless cells comprising
- an IP address server;
- a plurality of wireless cells, each said cell operative to:
  (1) estimate a total IP address pool for each said wireless cell and provide said estimated total IP pool to said IP address server; and
  (2) estimate a guard band portion of the total IP address pool for each said wireless cell and provide said estimated guard band portion to said IP address server;
- said IP address server operative to determine an allowed total IP address pool and allowed guard band portion for each of said plurality of wireless cells, said IP address server utilizing the estimated total IP address pool and estimated guard band portion from each of said plurality of wireless cells in determining the allowed total IP address pool and allowed guard band portion for each of said plurality of wireless cells; and
- each said wireless cell operative to assign a priority level to a mobile host requesting an IP address associated with each said wireless cell, wherein said priority level is set at a first level in the case of a handoff mobile hoist and at a second level in the case of a resident mobile host, said first level being greater than sad second level.

11. The system of claim 10 wherein said IP address server is remote from said plurality of wireless cells and each of said wireless cells includes an individual IP address server.

* * * * *

UNITED STATES PATENT AND TRADEMARK OFFICE
CERTIFICATE OF CORRECTION

| | | |
|---|---|---|
| PATENT NO. | : 6,795,709 B2 | Page 1 of 1 |
| APPLICATION NO. | : 09/840254 | |
| DATED | : September 21, 2004 | |
| INVENTOR(S) | : Agrawal et al. | |

It is certified that error appears in the above-identified patent and that said Letters Patent is hereby corrected as shown below:

In the Drawings

In Fig. 2, Sheet 2 of 8, for Tag "12", in Line 5, delete "INLCUDING" and insert -- INCLUDING --, therefor.

In the Claims

In Column 8, Line 21, in Claim 5, delete "steps;" and insert -- steps: --, therefor.

In Column 8, Line 55, in Claim 7, delete "hand portion" and insert -- band portion --, therefor.

In Column 8, Line 61, in Claim 7, delete "a firs" and insert -- a first --, therefor.

In Column 8, Line 66, in Claim 7, delete "IP addreses" and insert -- IP addresses --, therefor.

In Column 9, Line 19, in Claim 9, delete "each the plurality" and insert -- each of the plurality --, therefor.

In Column 10, Line 2, in Claim 10, delete "comprising" and insert -- comprising: --, therefor.

In Column 10, Line 23, in Claim 10, delete "hoist" and insert -- host --, therefor.

In Column 10, Line 25, in Claim 10, delete "sad second" and insert -- said second --, therefor.

Signed and Sealed this
Thirtieth Day of December, 2014

Michelle K. Lee
*Deputy Director of the United States Patent and Trademark Office*